(12) United States Patent
Yokota

(10) Patent No.: US 11,555,428 B2
(45) Date of Patent: Jan. 17, 2023

(54) CENTRIFUGAL OIL MIST SEPARATOR

(71) Applicant: SUBARU CORPORATION, Tokyo (JP)

(72) Inventor: Atsushi Yokota, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 252 days.

(21) Appl. No.: 17/096,294

(22) Filed: Nov. 12, 2020

(65) Prior Publication Data

US 2021/0189932 A1 Jun. 24, 2021

(30) Foreign Application Priority Data

Dec. 20, 2019 (JP) .............................. JP2019-230840

(51) Int. Cl.
| | |
|---|---|
| *F01N 3/037* | (2006.01) |
| *B01D 45/14* | (2006.01) |
| *B04C 3/00* | (2006.01) |
| *B04C 9/00* | (2006.01) |
| *F01N 5/04* | (2006.01) |
| *F01M 13/04* | (2006.01) |
| *B64D 27/04* | (2006.01) |
| *F04D 25/02* | (2006.01) |

(52) U.S. Cl.
CPC ............. *F01N 3/037* (2013.01); *B01D 45/14* (2013.01); *B04C 3/00* (2013.01); *B04C 9/00* (2013.01); *B64D 27/04* (2013.01); *F01M 13/04* (2013.01); *F01N 5/04* (2013.01); *F04D 25/02* (2013.01); *B04C 2009/007* (2013.01); *F01M 2013/0422* (2013.01)

(58) Field of Classification Search
CPC ........... F01N 3/037; B01D 45/14; B04C 3/00; B04C 9/00; B04C 2009/007
See application file for complete search history.

(56) References Cited

U.S. PATENT DOCUMENTS

| | | | | |
|---|---|---|---|---|
| 4,761,951 | A * | 8/1988 | Ishida | ..................... F02B 37/18<br>55/467 |
| 7,717,101 | B2 | 5/2010 | Beetz et al. | |
| 8,496,721 | B2 * | 7/2013 | Meusel | ................... F01L 1/047<br>55/447 |

FOREIGN PATENT DOCUMENTS

| | | | | |
|---|---|---|---|---|
| DE | 19822183 A1 * | 11/1999 | ............. | B01D 45/14 |
| JP | 2008-540906 A | 11/2008 | | |

* cited by examiner

*Primary Examiner* — Ngoc T Nguyen
(74) *Attorney, Agent, or Firm* — Troutman Pepper Hamilton Sanders LLP

(57) ABSTRACT

According to one implementation, a centrifugal oil mist separator includes a duct, a fan and a power transmission mechanism. The duct forms a flow path of a first exhaust gas discharged from an engine. The first exhaust gas includes oil mist. The fan is disposed inside the duct. The power transmission mechanism rotates the fan using energy of a second exhaust gas discharged from the engine. The second exhaust gas includes no oil mist.

20 Claims, 4 Drawing Sheets

CENTRIFUGAL OIL MIST SEPARATOR

CROSS REFERENCES TO RELATED APPLICATIONS

This application is based upon and claims the benefit of priority from Japanese Patent Application No. 2019-230840, filed on Dec. 20, 2019; the entire contents of which are incorporated herein by reference.

FIELD

Implementations described herein relate generally to a centrifugal oil mist separator, a reciprocating engine, an aircraft, and a method of separating oil mist.

BACKGROUND

Conventionally, a centrifugal oil mist separator has been proposed as a device for removing engine oil included in blowby gas leaked from an engine (for example, refer to Japanese Patent Application Publication JP2008-540906A). A centrifugal oil mist separator has a tubular vessel, which forms a flow path of blowby gas including oil mist, and a fan disposed inside the vessel so that the oil mist can be separated by rotating the vessel and generating a swirl flow in the blowby gas.

However, the conventionally proposed centrifugal oil mist separator must have a tubular vessel to be rotated whose length is about 10 times the diameter of the vessel. Accordingly, the conventional centrifugal oil mist separator cannot be used in a restricted installation area like an inside of a discharge duct of cooling air from an engine, for example, although the conventional centrifugal oil mist separator can be built in a proposed cam shaft to be used.

Accordingly, an object of the present invention is to provide a smaller centrifugal oil mist separator.

SUMMARY OF THE INVENTION

In general, according to one implementation, a centrifugal oil mist separator includes a duct, a fan and a power transmission mechanism. The duct forms a flow path of a first exhaust gas discharged from an engine. The first exhaust gas includes oil mist. The fan is disposed inside the duct. The power transmission mechanism includes at least one of gears, a power transmission belt rotating by rollers, and a chain moving by sprockets which rotates the fan using energy of a second exhaust gas discharged from the engine. The second exhaust gas includes no oil mist.

Further, according to one implementation, a centrifugal oil mist separator includes a duct and a fan. The duct forms a flow path of an exhaust gas discharged from an engine. The exhaust gas includes oil mist. The fan is disposed inside the duct. A heatsink is formed on at least one of an inner surface and an outer surface of the duct.

Further, according to one implementation, a reciprocating engine includes the above-mentioned centrifugal oil mist separator.

Further, according to one implementation, an aircraft includes the above-mentioned reciprocating engine.

Further, according to one implementation, a method of separating oil mist includes: disposing a fan inside a duct forming a flow path of a first exhaust gas discharged from an engine; rotating the fan using energy of a second exhaust gas discharged from the engine; and separating oil mist from the first exhaust gas by contacting the first exhaust gas with an inner surface of the duct. The first exhaust gas includes the oil mist. The second exhaust gas includes no oil mist.

DETAILED DESCRIPTION

A centrifugal oil mist separator, a reciprocating engine, an aircraft and a method of separating oil mist according to implementations of the present invention will be described with reference to the accompanying drawings.

(First Implementation)
(Structure and Function)

Figure 1:
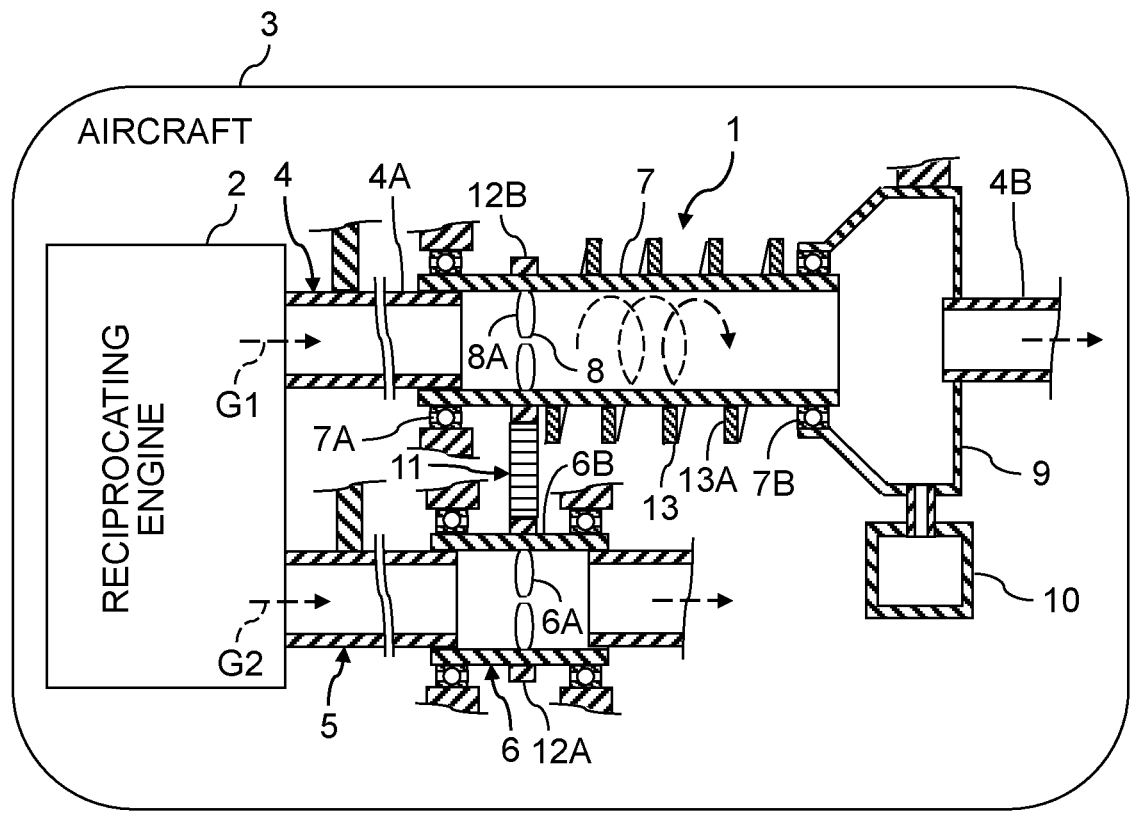
FIG. 1 shows a structure of a reciprocating engine of an aircraft having a centrifugal oil mist separator according to the first implementation of the present invention.

FIG. 1 shows a structure of a reciprocating engine of an aircraft having a centrifugal oil mist separator according to the first implementation of the present invention.

A centrifugal oil mist separator 1 is a removal device which separates oil mist from the first exhaust gas G1, including the oil mist, discharged from an engine. Therefore, the centrifugal oil mist separator 1 is included in an engine typified by a reciprocating engine 2. Although FIG. 1 shows an example of attaching the centrifugal oil mist separator 1 to the reciprocating engine 2 included in an aircraft 3, such as a fixed wing aircraft or a rotor craft, the centrifugal oil mist separator 1 may be attached to a reciprocating engine of an automobile or the like so that oil mist can be collected.

The first exhaust duct 4 and the second exhaust duct 5 are coupled to the reciprocating engine 2. The first exhaust duct 4 forms a flow path of the first exhaust gas G1 including oil mist while the second exhaust duct 5 forms a flow path of the second exhaust gas G2 including no oil mist. Therefore, the centrifugal oil mist separator 1 which separates oil mist from the first exhaust gas G1 including the oil mist is placed in the first exhaust duct 4. Examples of the first exhaust gas G1 including oil mist include cooling air including engine oil mist as well as blowby gas including engine oil mist. Meanwhile, examples of the second exhaust gas G2 which does not include any oil mist include secondary cooling air, into which oil mist is not mixed, and combustion exhaust gas from an engine, into which oil mist is not mixed. A turbine 6 is placed in the second exhaust duct 5 through which the second exhaust gas G2 flows. Therefore, the turbine 6 rotates by the energy of the second exhaust gas G2 discharged from the reciprocating engine 2.

The centrifugal oil mist separator 1 has a rotating duct 7, a fan 8, an oil recovery vessel 9, an oil recovery tank 10 and a power transmission mechanism 11. Each of the rotating duct 7 and the oil recovery vessel 9 composes a part of the first exhaust duct 4 which forms a flow path of the first exhaust gas G1 discharged from the reciprocating engine 2. The oil recovery vessel 9 is coupled to the outlet side of the rotating duct 7. Therefore, the inlet port of the rotating duct 7 is the inlet port of the centrifugal oil mist separator 1 while the outlet port of the oil recovery vessel 9 is the outlet port of the centrifugal oil mist separator 1.

The rotating duct 7 is a cylindrical pipe which forms the flow path of the first exhaust gas G1. Both ends of the rotating duct 7 are rotatably supported by the bearing 7A and the bearing 7B. The inlet port of the rotating duct 7 is coupled to the outlet port of a fixed duct 4A which composes a part in the upstream side of the first exhaust duct 4. The fixed duct 4A is fixed to a desired position, such as a casing of the reciprocating engine 2, in the aircraft 3. Meanwhile, the oil recovery vessel 9 coupled to the outlet port of the rotating duct 7 is fixed to a desired position, such as the casing of the reciprocating engine 2, in the aircraft 3. Therefore, the rotating duct 7 rotates relatively to the fixed duct 4A and the oil recovery vessel 9.

The fan 8 is disposed inside the rotating duct 7. The fan 8 is fixed to the inner surface of the rotating duct 7. Therefore, when the rotating duct 7 is rotated, the fan 8 is also rotated together with the rotating duct 7.

Figure 2:
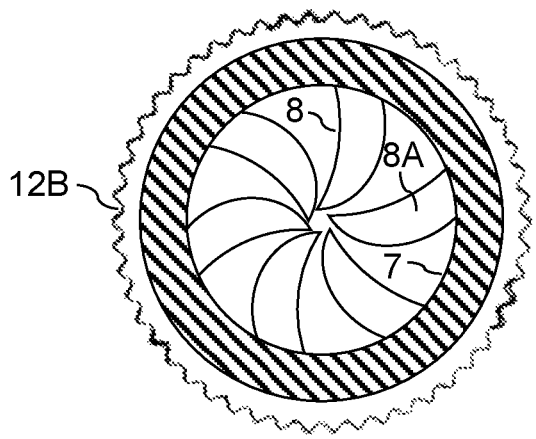
FIG. 2 is an enlarged right side view of the fan, shown in FIG. 1, which shows an example of a shape of the fan.

FIG. 2 is an enlarged right side view of the fan 8, shown in FIG. 1, which shows an example of a shape of the fan 8.

The fan 8 has blades 8A having shapes by which the first exhaust gas G1 is sucked so as to generate a swirl flow. Each blade 8A which composes the fan 8 is fixed to the inner wall of the rotating duct 7.

Therefore, when the fan 8 is rotated together with the rotating duct 7, a swirl flow of the first exhaust gas G1 is generated in the downstream side of the fan 8. Moreover, increase in pressure of the first exhaust gas G1 in the downstream side of the fan 8 is suppressed since the first exhaust gas G1 is sucked by the fan 8. Thus, the oil mist included in the first exhaust gas G1 which has become the swirl flow collides and condenses on the inner wall of the rotating duct 7 by centrifugal force. Thereby, the first exhaust gas G1 can be separated from the oil.

The liquid oil, which has condensed on the inner wall of the rotating duct 7, flows along the inner wall of the rotating duct 7 and finally flows into the oil recovery vessel 9 from the outlet port of the rotating duct 7. The oil recovery vessel 9 is a conical pipe of which diameter gradually increases toward the outlet side from the inlet side. The diameter of the outlet port itself of the oil recovery vessel 9 is narrowed, and the inlet port of the fixed duct 4B forming a part in the downstream side of the first exhaust duct 4 is coupled to the outlet port of the oil recovery vessel 9. The fixed duct 4B is fixed to a desired position, such as the casing of the reciprocating engine 2, in the aircraft 3.

Therefore, the liquid oil, which has flowed into the oil recovery vessel 9, gathers in an area, having a large diameter, near the outlet port of the oil recovery vessel 9 due to the gravity, interfacial tension and a flow of the first exhaust gas G1. Meanwhile, the first exhaust gas G1 is discharged toward the flow direction of the first exhaust gas G1 from the outlet port of the oil recovery vessel 9 into the fixed duct 4B. Accordingly, the first exhaust gas G1 from which the oil mist has been removed is discharged from the outlet port of the oil recovery vessel 9, which is the outlet port of the centrifugal oil mist separator 1, to the fixed duct 4B.

The oil recovery tank 10 is coupled to the bottom formed in the lower part of the portion having the maximum diameter of the oil recovery vessel 9 through a pipe. Thereby, the oil which has gathered in the oil recovery vessel 9 is collected in the oil recovery tank 10. The oil collected in the oil recovery tank 10 can be reused.

The power transmission mechanism 11 is a device which transmits power to the rotating duct 7 and the fan 8 so that the rotating duct 7 and the fan 8 may be rotated. In particular, the power transmission mechanism 11 is configured to rotate the rotating duct 7 and the fan 8 by utilizing the energy of the second exhaust gas G2 including no oil mist.

Figure 3:
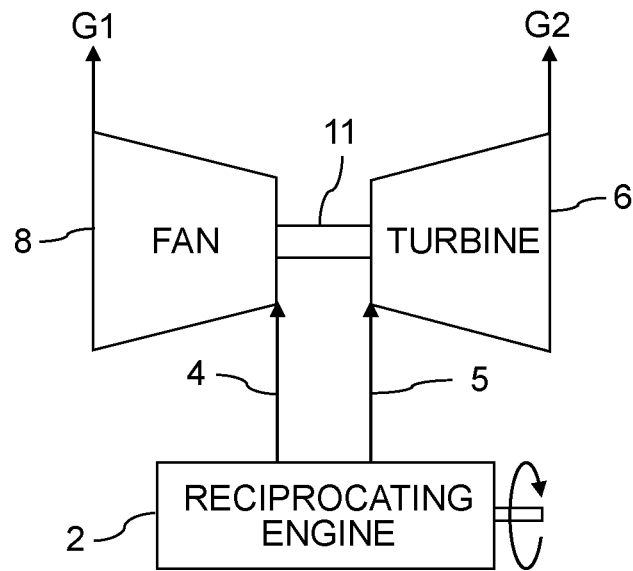
FIG. 3 is a piping diagram of the reciprocating engine which shows a configuration for rotating the fan of the centrifugal oil mist separator shown in FIG. 1.

FIG. 3 is a piping diagram of the reciprocating engine 2 which shows a configuration for rotating the fan 8 of the centrifugal oil mist separator 1 shown in FIG. 1.

As shown in FIGS. 1 and 3, the torque output from an output shaft 6B of the turbine 6 which rotates with the energy of the second exhaust gas G2 discharged from the reciprocating engine 2 can be transmitted to the outer surface of the rotating duct 7 by the power transmission mechanism 11. In this case, the rotating duct 7 functions as an annular rim fixing the blades 8A of the fan 8, and thereby the torque output from the output shaft 6B of the turbine 6 can be transmitted to the fan 8.

That is, the turbine 6 can be disposed on the flow path of the second exhaust gas G2 discharged from the reciprocating engine 2 so as to collect the energy of the second exhaust gas G2, and the fan 8 of the centrifugal oil mist separator 1 can be rotated by regeneration of the energy of the second exhaust gas G2.

Accordingly, the rotating duct 7 and the fan 8 can be rotated without receiving transmission of torque from any other power source than the output shaft 6B of the turbine 6. That is, the rotating duct 7 and the fan 8 can be rotated only by the torque transmitted from the output shaft 6B of the turbine 6 and the energy of the first exhaust gas G1 without newly installing a dedicated power source, such as a motor.

In addition, since the fan 8 is rotated by regeneration of the energy of the second exhaust gas G2, the rotation speed of the rotating duct 7 and the fan 8, and the energy of a swirl flow of the first exhaust gas G1 to be generated can be increased compared with those of a conventional centrifugal oil mist separator which rotates a fan only by the energy of gas itself from which oil mist should be removed. Therefore, the aggregate efficiency of oil mist can be improved and the length of the rotating duct 7 can be shortened, compared with those of the conventional centrifugal oil mist separator.

As a result, the size and weight of the centrifugal oil mist separator 1 can be reduced, and therefore the centrifugal oil mist separator 1 can be placed even when the length of the first exhaust duct 4 is short like a case of an exhaust duct of the cooling air including an engine oil mist.

The power transmission mechanism 11 which transmits torque to the rotating duct 7 can be composed of desired machine elements, such as gears, a power transmission belt rotating by frictional force between the power transmission belt and rollers, or a chain moving by rotation of sprockets, in accordance with a structure of the turbine 6.

In the example shown in FIG. 1, the blades 6A of the turbine 6 are fixed to the inner surface of an annular rim which also serves as a part of a casing of the second exhaust duct 5. Moreover, the annular rim is rotatably coupled to the second exhaust duct 5 by bearings or the like. Therefore, the output shaft 6B of the turbine 6 is the hollow rim and is placed not at the rotation center of the turbine 6 but at the circumference.

Accordingly, the power transmission mechanism 11 can be composed of machine elements, such as gears and a power transmission shaft, e.g., machine elements including the first gear 12A formed on the outer surface of the output shaft 6B of the turbine 6 and the second gear 12B formed on the outer surface of the rotating duct 7. As a matter of course, the torque output from the output shaft 6B of the turbine 6 may be transmitted to the rotating duct 7 by a power transmission belt or the like, instead of the gear 12A and the gear 12B.

The length of the rotating duct 7 is determined so that sufficient quantity of oil mist can aggregate to be separated on the inner wall. Therefore, when the aggregation efficiency of oil mist, i.e., the aggregation amount of oil mist per unit length of the rotating duct 7 is increased, the length of the rotating duct 7 can be shortened.

For that reason, a heatsink 13 for heat radiation may be formed on at least one of the inner surface and the outer surface of the rotating duct 7. The heatsink 13 can be formed by concavities and convexities having a desired shape, such as a structure having many projections or a bellows-shaped structure as well as a plate-like fin 13A as exemplified by FIG. 1 so that the surface area may become large as much as possible. In the example shown in FIG. 1, the fin 13A having a spiral structure toward the length direction of the rotating duct 7 is formed, as the heatsink 13, on the outer surface of the rotating duct 7.

When the heatsink 13 is formed on the rotating duct 7, the rotating duct 7 can be air-cooled. In this case, the temperature of the inner wall of the rotating duct 7 can be lowered compared with that in a case where the heatsink 13 is not formed. Thereby, it becomes possible to efficiently aggregate oil mist collided with the inner wall of the rotating duct 7. As a result, it becomes possible to separate oil even when the length of the rotating duct 7 is shortened compared with a case where the heatsink 13 is not formed.

Since the heatsink 13, such as the fin 13A, fixed to the rotating duct 7 rotates together with the rotating duct 7, the heat of the rotating duct 7 can be efficiently radiated. In particular, when the fin 13A has a spiral structure, an air flow can be formed in a space formed between the adjacent fins 13A, and thereby the heat radiation efficiency can be improved further.

Alternatively, many disk-like fins whose height direction is perpendicular to the rotation axis of the rotating duct 7 may be formed on the outer surface of the rotating duct 7. In this case, the effect that air can easily flow between the fins can be also obtained during rotation of the rotating duct 7 by the fins 13A having a simple structure instead of a spiral structure. The height direction of at least one fin formed on the outer surface of the rotating duct 7 may be slanted to the rotation axis of the rotating duct 7. In this case, the increase in the size of the rotating duct 7 can be suppressed while the easiness in flowing air and the surface area of the fin or fins can be secured.

Examples of a material of the heatsink 13, such as the fin 13A, include a metal, such as aluminum, iron, or copper, having high thermal conductivity. Aluminum is a preferable example from a viewpoint of weight saving.

Figure 4:
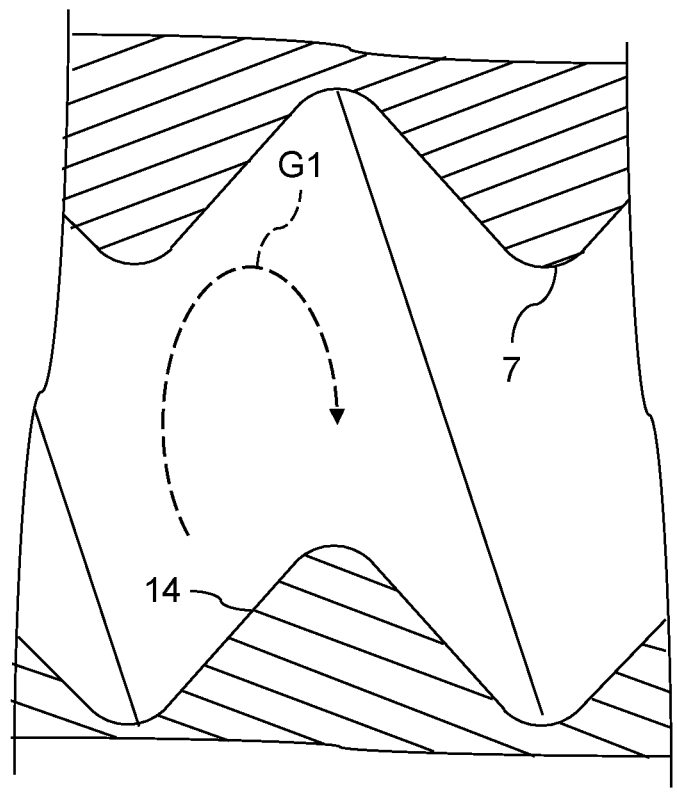
FIG. 4 is an enlarged longitudinal sectional view of the rotating duct of the centrifugal oil mist separator shown in FIG. 1, which shows an example in which concavity and convexity are formed on the inner surface of the rotating duct for increasing the contact frequency with the first exhaust gas including oil mist.

FIG. 4 is an enlarged longitudinal sectional view of the rotating duct 7 of the centrifugal oil mist separator 1 shown in FIG. 1, which shows an example in which concavity and convexity 14 are formed on the inner surface of the rotating duct 7 for increasing the contact frequency with the first exhaust gas G1 including oil mist.

As exemplified by FIG. 4, the concavity and convexity 14, in place of the heatsink 13, or also serving as the heatsink 13, may be formed on the inner surface of the rotating duct 7 in order to improve the contact frequency with the first exhaust gas G1 including oil mist. As a concrete example, concavity and convexity having a spiral structure whose rotation direction is opposite to the rotation direction of the fan 8 toward the length direction of the rotating duct 7 can be formed on the inner wall of the rotating duct 7 as the concavity and convexity 14 for increasing the contact frequency as shown in FIG. 4.

The above-mentioned concavity and convexity 14 formed on the inner surface of the rotating duct 7 make it possible to easily contact a swirl flow of the first exhaust gas G1 including oil mist with the inner surface of the rotating duct 7, and thereby the aggregation efficiency of the oil mist can be improved. As a result, the length of the rotating duct 7 can be shortened without changing the recovery efficiency of oil.

The concavity and convexity 14 for improving the contact frequency may also be a shape, such as many projections or a bellows-shape, other than a spiral shape. Note that, the surface area of the inner surface of the rotating duct 7 having the concavity and convexity 14 is larger than the surface area of a cylindrical curved surface without the concavity and convexity 14. Therefore, when at least the inner wall of the rotating duct 7 is made of a material having high thermal conductivity, the concavity and convexity 14 can also be made to function as the heatsink 13.

As described above, the centrifugal oil mist separator 1, the reciprocating engine 2, the aircraft 3 and the method of separating oil mist dispose the fan 8 inside the first exhaust duct 4 forming a flow path of the first exhaust gas G1 including oil mist, rotate the rotating duct 7 and the fan 8 utilizing the energy of the second exhaust gas G2 including no oil mist, and separate the oil mist from the first exhaust gas G1 by contacting the first exhaust gas G1 with the inner surface of the rotating duct 7.

(Effects)

Accordingly, the centrifugal oil mist separator 1, the reciprocating engine 2, the aircraft 3 and the method of separating oil mist allow simplification, miniaturization and weight saving of devices. That is, since the rotating duct 7 and the fan 8 of the centrifugal oil mist separator 1 can be rotated without a new power source, structural simplification, weight saving and miniaturization of the centrifugal oil mist separator 1 can be attained. In particular, since the fan 8 is rotated by regenerating the energy of the second exhaust gas G2, the aggregation efficiency and the recovery efficiency of oil mist can be improved, and thereby the length of the rotating duct 7 can be shortened, compared with those in the conventional system which rotates a fan only with the energy of target gas.

In addition, the separation efficiency of oil can be improved further by attaching the heatsink 13 on the rotating duct 7 and/or forming the concavity and convexity 14, such as a spiral structure, for increasing the contact frequency with the first exhaust gas G1 including oil mist, on the inner surface of the rotating duct 7. As a result, the length of the rotating duct 7 can be shortened further.

Furthermore, the fan 8 of the centrifugal oil mist separator 1 is rotated with the energy of the second exhaust gas G2 exhausted from the reciprocating engine 2. Therefore, when the output of the reciprocating engine 2 increases, and thereby the energy of the second exhaust gas G2 increases, the flow rate of the first exhaust gas G1 also increases together with the rotation speed of the fan 8. Therefore, when the first exhaust gas G1 is cooling air for the reciprocating engine 2, rise in temperature of the reciprocating engine 2 due to increase in the output of the reciprocating engine 2 can be addressed by increasing a cooling effect achieved by increase in the flow rate of the first exhaust gas G1 which is the cooling air.

(Modifications)

Figure 5:
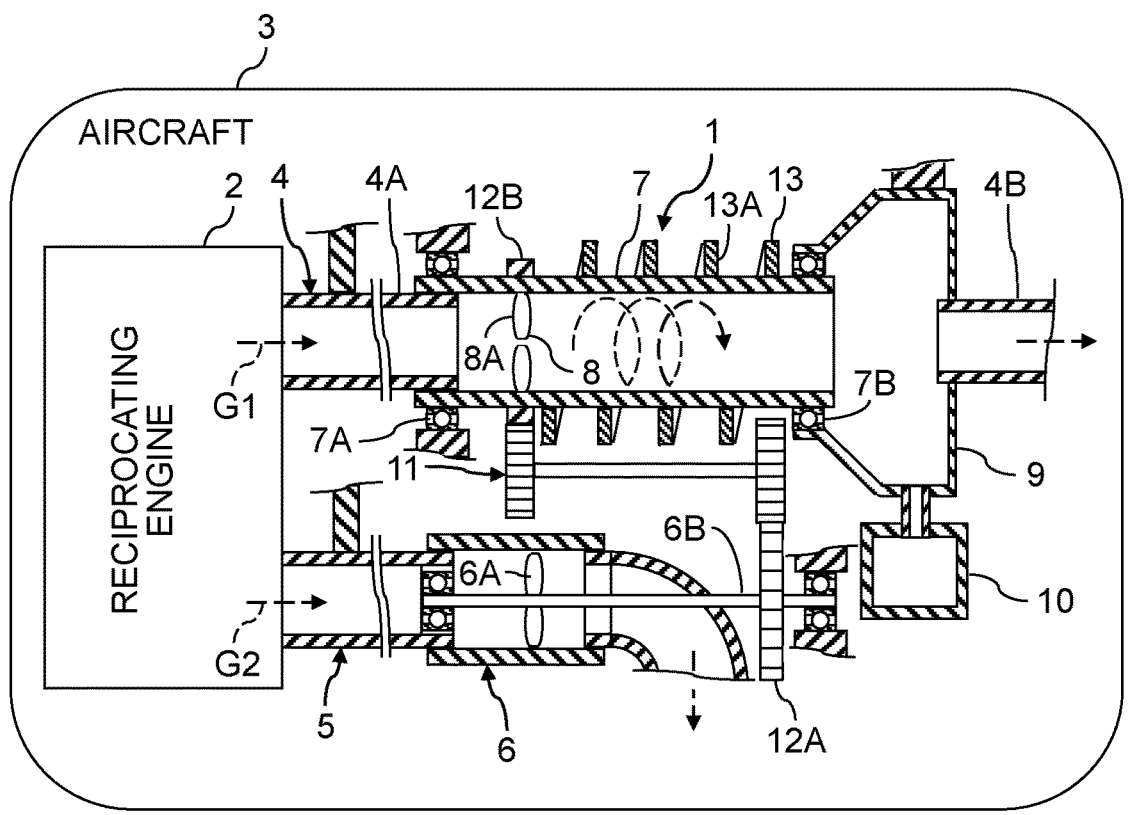
FIG. 5 shows a structure of an example of a modification of the reciprocating engine shown in FIG. 1.

FIG. 5 shows a structure of an example of a modification of the reciprocating engine 2 shown in FIG. 1.

As shown in FIG. 5, an output shaft 6B of the turbine 6 may be disposed at the rotation center of the turbine 6. In other words, the blades 6A may be fixed to the output shaft 6B of the turbine 6.

In that case, the output shaft 6B of the turbine 6 can be projected from the inside of the second exhaust duct 5 out to the outside of the second exhaust duct 5 by bending the second exhaust duct 5. In addition, the first gear 12A composing the power transmission mechanism 11 can be coupled to the output shaft 6B of the turbine 6 projected outside the second exhaust duct 5. It is similar in the case where the power transmission mechanism 11 is composed of a power transmission belt and the like.

Note that, both ends of the output shaft 6B of the turbine 6 can be rotatably supported by bearings or the like. As for a bearing disposed inside the second exhaust duct 5, the outer ring side can be fixed to the inner wall of the second exhaust duct 5 with supporting columns each having a shape, such as a spoke, which does not interrupt the second exhaust gas G2 as much as possible.

Besides the example shown in FIG. 5, when the power transmission mechanism 11 is composed of a shaft to which a bevel gear has been coupled, the torque can be transmitted with changing the rotation axis direction of shaft. Therefore, when the first bevel gear is fixed to the output shaft 6B of the turbine 6 while a shaft whose one end is fixed to the second bevel gear engaged with the first bevel gear is disposed so that the shaft may pass through the wall surface of the second exhaust duct 5, for example, the torque generated in the output shaft 6B of the turbine 6 can be transmitted to the outside of the second exhaust duct 5 without bending the second exhaust duct 5.

(Second Implementation)

Figure 6:
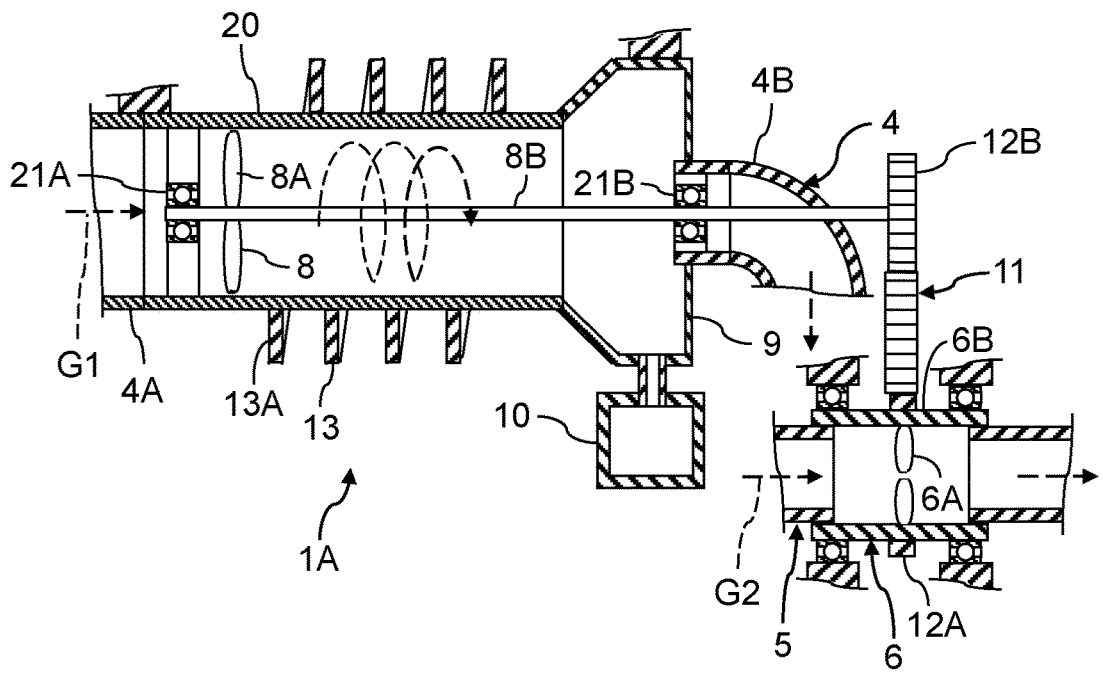
FIG. 6 shows structures of a centrifugal oil mist separator and a turbine included in a reciprocating engine of an aircraft according to the second implementation of the present invention.
Figure 7:
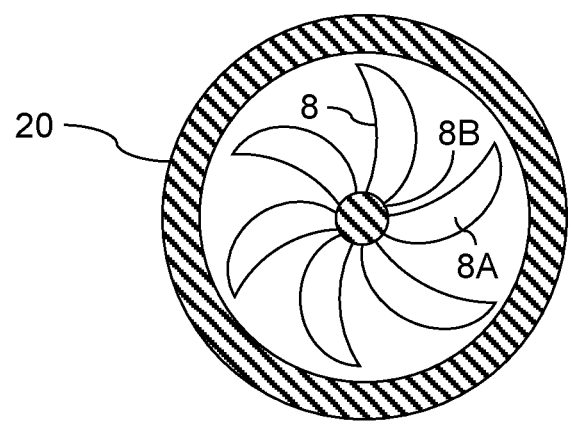
FIG. 7 is an enlarged right side view of the centrifugal oil mist separator shown in FIG. 6 which shows an example of a shape of a fan of the centrifugal oil mist separator.

FIG. 6 shows structures of a centrifugal oil mist separator and a turbine included in a reciprocating engine of an aircraft according to the second implementation of the present invention, and FIG. 7 is an enlarged right side view of the centrifugal oil mist separator shown in FIG. 6 which shows an example of a shape of a fan of the centrifugal oil mist separator.

A centrifugal oil mist separator 1A in the second implementation shown in FIG. 6 and FIG. 7 is different from the centrifugal oil mist separator 1 in the first implementation in a point that a fixed duct 20 is disposed instead of the rotating duct 7 so that the fan 8 may rotate relatively to the fixed duct 20. Other structures and functions of the centrifugal oil mist separator 1A in the second implementation do not substantially differ from those of the centrifugal oil mist separator 1 in the first implementation. Therefore, only the centrifugal oil mist separator 1A and the turbine 6 are illustrated. Further, the same signs are attached to the same elements and corresponding elements, and explanation thereof is omitted.

The centrifugal oil mist separator 1A in the second implementation includes the fixed duct 20, the fan 8, the oil recovery vessel 9, the oil recovery tank 10 and the power transmission mechanism 11. The fixed duct 20 is a pipe serving as a part of the first exhaust duct 4 through which the first exhaust gas G1 flows. The inlet port side of the fixed duct 20 is coupled to the outlet port of the fixed duct 4A serving as a part of the first exhaust duct 4 in the upstream side while the outlet port side of the fixed duct 20 is coupled to the inlet port of the oil recovery vessel 9. Therefore, the inlet port of the fixed duct 20 is the inlet port of the centrifugal oil mist separator 1 while the outlet port of the oil recovery vessel 9 is the outlet port of the centrifugal oil mist separator 1.

The fixed duct 20 is fixed to a desired position, such as a casing of the reciprocating engine 2, in the aircraft 3, similarly to the fixed duct 4A in the upstream side and the fixed duct 4B in the downstream side. Therefore, the fixed duct 20 does not rotate.

The fan 8 is rotatably disposed inside the fixed duct 20. Therefore, the fan 8 practically has a structure including blades 8A and a rotating shaft 8B for fixing the blades 8A. In that case, the rotating shaft 8B of the fan 8 can be rotatably supported by bearings 21A and 21B. Each of the bearings 21A and 21B can be fixed to desired positions, on the inner wall of the first exhaust duct 4 including the fixed duct 20, by supporting columns each having a shape like a spoke which does not interrupt the first exhaust gas G1 as much as possible.

In order to rotate the fan 8, it is necessary to transmit torque to the rotating shaft 8B disposed at the rotation center of the fan 8. For that reason, the fixed duct 4A in the upstream side or the fixed duct 4B in the downstream side can be curved so that the rotating shaft 8B of the fan 8 can be projected from the pipe wall of the curved first exhaust duct 4 to the outside of the first exhaust duct 4, similarly to the output shaft 6B of the turbine 6 exemplified by FIG. 5.

Thereby, it becomes possible to rotate the fan 8 relative to the fixed duct 20 by the power transmission from the power transmission mechanism 11 to the rotating shaft 8B of the fan 8. Specifically, the fan 8 can be rotated relative to the fixed duct 20 by transmitting the torque output from the output shaft 6B of the turbine 6 to the portion of the rotating shaft 8B of the fan 8 which is projected outside the first exhaust duct 4.

For that purpose, the power transmission mechanism 11 can be composed of machine elements, such as gears and a power transmission shaft, including the first gear 12A fixed to the output shaft 6A of the turbine 6 and the second gear 12B fixed to the rotating shaft 8B of the fan 8 projected outside the first exhaust duct 4, for example. As a matter of course, the torque output from the output shaft 6B of the turbine 6 may be transmitted to the rotating shaft 8B of the fan 8 by a power transmission belt or the like, instead of the gears 12A and 12B.

The rotating shaft 8B of the fan 8 disposed inside the fixed duct 20 does not receive torque transmitted from any other power source than the output shaft 6A of the turbine 6, and therefore the fan 8 rotates only by regeneration of the energy of the second exhaust gas G2 and the energy of the first exhaust gas G1. When the fan 8 is rotated inside the fixed duct 20, a swirl flow of the first exhaust gas G1 is formed. Therefore, oil mist collides and aggregates on the inner wall of the fixed duct 20 without rotating the fixed duct 20. As a result, oil included in the first exhaust gas G1 can be separated and recovered.

Accordingly, the heatsink 13 may be formed on the fixed duct 20 and/or the concavity and convexity 14 for improving contact frequency with the first exhaust gas G1 may be formed on the inner surface of the fixed duct 20, similarly to the rotating duct 7 in the first implementation. Thereby, the aggregation efficiency of oil mist can be improved. As a result, the length of the fixed duct 20 can be shortened.

According to the above-mentioned second implementation, safety can be improved since a target to be rotated is only the fan 8 as well as the effect similar to that in the first implementation is attained. Specifically, it is possible to decrease the number of driving parts, such as the rotating duct 7 in the first implementation, and to prevent leakage of the first exhaust gas G1 from both ends of the fixed duct 20.

In addition, since a target to be rotated is only the fan 8, the size of each bearing can be made small compared with the case where the rotating duct 7 is rotated as described in the first implementation. As a result, weight saving of the centrifugal oil mist separator 1A can be attained. In addition, the fixed duct 4A in the upstream side and the fixed duct 20 can be also composed of the common pipe. In that case, the number of parts of the reciprocating engine 2 can be reduced.

Note that, also in the second implementation, the output shaft 6B disposed at the rotation center of the turbine 6 as exemplified by FIG. 5 may also be projected from the curved second exhaust duct 5 so that the torque output from the projected output shaft 6B of the turbine 6 may be transmitted to the rotating shaft 8B of the fan 8 projected from the first exhaust duct 4. Moreover, the power transmission mechanism 11 may be composed using bevel gears.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A centrifugal oil mist separator comprising:
   a duct forming a flow path of a first exhaust gas discharged from an engine, the first exhaust gas including oil mist;
   a fan disposed inside the duct; and
   a power transmission mechanism including at least one of gears, a power transmission belt rotating by rollers, and a chain moving by sprockets that rotates the fan using energy of a second exhaust gas discharged from the engine, the second exhaust gas including no oil mist.

2. The centrifugal oil mist separator according to claim 1,
   wherein the fan is fixed to an inside of the duct, and
   the power transmission mechanism rotates the fan together with the duct.

3. The centrifugal oil mist separator according to claim 1,
   wherein the fan is rotatably disposed inside the duct, and
   the power transmission mechanism rotates the fan relatively to the duct.

4. The centrifugal oil mist separator according to claim 3,
   wherein the power transmission mechanism transmits torque to a rotating shaft of the fan, the torque being output from an output shaft of a turbine rotating by the energy of the second exhaust gas.

5. The centrifugal oil mist separator according to claim 4,
   wherein the rotating shaft of the fan does not receive transmission of any torque from any power source other than the output shaft of the turbine.

6. The centrifugal oil mist separator according to claim 4,
   wherein the duct is curved,
   the rotating shaft of the fan is projected from a pipe wall of the duct to an outside of the duct, and
   the power transmission mechanism transmits the torque to a portion of the rotating shaft, the portion having been projected to the outside of the duct.

7. The centrifugal oil mist separator according to claim 1, further comprising:
   a heatsink formed on at least one of an inner surface and an outer surface of the duct.

8. A centrifugal oil mist separator comprising:
   a duct forming a flow path of an exhaust gas discharged from an engine, the exhaust gas including oil mist; and
   a fan disposed inside the duct;
   wherein a heatsink is formed on at least one of an inner surface and an outer surface of the duct.

9. The centrifugal oil mist separator according to claim 7,
   wherein the heatsink includes a fin formed on the outer surface of the duct, the fin being spiral toward a length direction of the duct.

10. The centrifugal oil mist separator according to claim 1,
    wherein a concavity and convexity for increasing a contact frequency with the first exhaust gas are formed on an inner surface of the duct.

11. The centrifugal oil mist separator according to claim 10,
    wherein the concavity and the convexity have a spiral shape toward a length direction of the duct, a rotation direction of the spiral shape being opposite to a rotation direction of the fan.

12. The centrifugal oil mist separator according to claim 1,
    wherein the fan has blades having shapes by which the first exhaust gas is sucked and a swirl flow of the first exhaust gas is generated.

13. A reciprocating engine comprising:
    the centrifugal oil mist separator according to claim 1.

14. An aircraft comprising:
    the reciprocating engine according to claim 13.

15. A method of separating oil mist comprising:
    disposing a fan inside a duct forming a flow path of a first exhaust gas discharged from an engine, the first exhaust gas including oil mist;
    rotating the fan using energy of a second exhaust gas discharged from the engine, the second exhaust gas including no oil mist; and
    separating the oil mist from the first exhaust gas by contacting the first exhaust gas with an inner surface of the duct.

16. The centrifugal oil mist separator according to claim 8,
    wherein the heatsink includes a fin formed on the outer surface of the duct, the fin being spiral toward a length direction of the duct.

17. The centrifugal oil mist separator according to claim 8,
    wherein a concavity and convexity for increasing a contact frequency with the exhaust gas are formed on the inner surface of the duct.

18. The centrifugal oil mist separator according to claim 17,
    wherein the concavity and the convexity have a spiral shape toward a length direction of the duct, a rotation direction of the spiral shape being opposite to a rotation direction of the fan.

19. A reciprocating engine comprising:
the centrifugal oil mist separator according to claim 8.
20. An aircraft comprising:
the reciprocating engine according to claim 19.

* * * * *